US011105930B1

(12) United States Patent
Schmidt (10) Patent No.: US 11,105,930 B1
(45) Date of Patent: Aug. 31, 2021

(54) SELF CONTAINED SATELLITE-NAVIGATION-BASED METHOD AND MICRO SYSTEM FOR REAL-TIME RELATIVE-POSITION DETERMINATION

(71) Applicant: David K. Schmidt, Monument, CO (US)

(72) Inventor: David K. Schmidt, Monument, CO (US)

(73) Assignee: D.K. SCHMIDT & ASSOCIATES LLC, Monument, CO (US)

( * ) Notice: Subject to any disclaimer, the term of this patent is extended or adjusted under 35 U.S.C. 154(b) by 395 days.

(21) Appl. No.: 16/194,765

(22) Filed: Nov. 19, 2018

(51) Int. Cl.
| | | |
|---|---|---|
| *G01S 19/15* | (2010.01) |
| *G01S 19/49* | (2010.01) |
| *G06F 17/11* | (2006.01) |
| *G05D 1/06* | (2006.01) |
| *G01S 19/51* | (2010.01) |

(52) U.S. Cl.
CPC .............. *G01S 19/15* (2013.01); *G01S 19/49* (2013.01); *G01S 19/51* (2013.01); *G05D 1/0676* (2013.01); *G06F 17/11* (2013.01)

(58) Field of Classification Search
CPC .......... G01S 19/15; G01S 19/49; G01S 19/51; G05D 1/0676; G06F 17/11
See application file for complete search history.

(56) References Cited

U.S. PATENT DOCUMENTS

| | | | | |
|---|---|---|---|---|
| 9,561,868 B2 * | 2/2017 | Bourret | .................... | B64C 13/18 |
| 2009/0066560 A1 * | 3/2009 | Rambach | .................. | G01S 1/02 |
| | | | | 342/169 |
| 2014/0368378 A1 * | 12/2014 | Crain | .................... | G01S 13/867 |
| | | | | 342/25 A |
| 2015/0307207 A1 * | 10/2015 | Meunier | ................ | B62D 43/02 |
| | | | | 701/4 |
| 2018/0281988 A1 * | 10/2018 | Tellechea | ............. | G08G 5/0091 |

* cited by examiner

*Primary Examiner* — Erin F Heard
*Assistant Examiner* — Donald HB Braswell
(74) *Attorney, Agent, or Firm* — Martensen IP; Michael C. Martensen (57) ABSTRACT

A self-contained satellite-navigation-based (SatNav-based) method and micro system is disclosed, wherein SatNav-derived (e.g., GPS-derived) position and velocity measurements are obtained and processed to achieve a low cost, micro size, real-time solution for the position and velocity of the carrier relative to a vertical and/or horizontal plane of previously measured location and heading, and for the slant range from a fixed position located on said vertical or horizontal plane. The method includes two parts: 1) a method for defining both the spatial orientation of the vertical and/or horizontal plane of interest, along with a selected fixed position of interest on one of those planes, and 2) a method for obtaining the real-time relative position and velocity of the carrier relative to the plane(s) of interest, and its position relative to the fixed position of interest. This system and method thus provides the necessary information onboard the carrier to navigate relative to said vertical and/or horizontal plane, and relative to the said fixed position of interest on one of those planes. Therefore, this system and method should be especially useful for use on uninhabited aerial vehicles (UAVs) or drones, but may also be used on manned aircraft.

4 Claims, 6 Drawing Sheets

SELF CONTAINED SATELLITE-NAVIGATION-BASED METHOD AND MICRO SYSTEM FOR REAL-TIME RELATIVE-POSITION DETERMINATION

FEDERAL SPONSORSHIP

This invention was made with Government support under contract NNX14AL36A awarded by NASA. The Government has certain rights in the invention.

CROSS REFERENCE OF RELATED APPLICATIONS

This is a regular patent application following on a provisional application with application No. 62/607,637 and a filing date of Dec. 19, 2017.

FIELD OF PRESENT INVENTION

The present invention relates generally to navigation, and in particular, relates to aircraft navigation providing navigation guidance onboard aircraft that are landing at airports that do not contain a ground infrastructure in place to support precision approach. However, the invention is not restricted to aircraft navigation, and may have other unidentified uses.

CLASSIFICATIONS

G01S19/15 Aircraft landing systems
G01S19/39 Determining a navigation solution using signals transmitted by a satellite radio beacon positioning system the satellite radio beacon positioning system transmitting time-stamped messages, e.g. GPS [Global Positioning System], GLONASS [Global Orbiting Navigation Satellite System] or GALILEO

BACKGROUND OF THE PRESENT INVENTION

Over the last several decades, small satellite-navigation receivers have been commonly employed to determine real-time inertial-position measurements of a carrier. The Global Positioning System (GPS) is an example of a satellite-based, worldwide all-weather radio positioning and timing system. The GPS system was designed to provide precise position, velocity, and timing information on a global common grid system to an unlimited number of adequately equipped users.

A GPS receiver is the key for a user to access the Global Positioning System. A conventional, single antenna GPS receiver supplies world-wide, highly, accurate three dimensional position, velocity, and timing information. In a benign radio environment, the GPS signal propagation errors and GPS satellite errors, including selective availability, serve as the bounds for positioning errors.

A "precision approach" is an approach that is aligned with the runway. A precision approach system provides course guidance, distance from runway, and elevation to a pilot or autopilot. The Instrument Landing System (ILS) is one of the most common precision approach systems. Other navigation devices and systems have been employed for decades for aviation application.

The ILS is a radio navigation system that provides measurements of the horizontal and vertical position offsets of a carrier (i.e., an aircraft) relative to two intersecting geometric virtual planar surfaces, one vertical and one slightly inclined from horizontal. The vertical planar surface, referred to as the localizer plane, is aligned azimuthally with the centerline of the runway on which the aircraft is to land, while the inclined horizontal planar surface, referred to as the glide-slope plane, is normal to the vertical plane and inclined at a fixed angle from horizontal equal to the required glide-slope angle of the aircraft during landing approach. The line of intersection of the planes is thusly directed to a target point on the runway near which the aircraft is to touch down. Some ILS installations also provide measurements of the range of the carrier from that target point. An ILS provides a navigation and guidance system intended to accurately deliver the aircraft to the runway threshold even in the presence of crosswinds and poor visibility.

The ILS system includes a ground-based component and a carrier-based component. The ground-based component provides the measurement of the carrier-position offset from the vertical (localizer) plane, as well as the measurement of the carrier-position offset from the inclined horizontal (glide-slope) plane. The carrier-based component consists of a receiver that receives and processes the information obtained from the ground transmitter, either displaying it to the pilot or providing it to an autopilot. So the ILS requires both extensive ground-based components, and well as carrier-based components.

Satellite- or GPS-based systems, such as the Wide Area Augmentation System (WAAS) or the Ground Based Augmentation Systems (GBAS), are being developed to enable aircraft to rely on the GPS for various phases of flight, including precision approaches to any airport within its coverage area. Hence such systems can be used instead of an ILS. These systems require a network of ground-based reference stations to improve the accuracy of the GPS-derives position measurements. Hence, these systems also require extensive ground-based components as well as carrier-based components.

The United States has also developed the U.S. Nationwide Differential GPS System (NDGPS) for obtaining GPS-based inertial-position measurements of ground and maritime vehicles. This system also requires a network of ground stations, similar to those used in the GBAS cited previously.

U.S. Pat. No. 6,239,745B1, "Satellite Landing System Having Instrument Landing System Look Alike Guidance," Issued to D. Alexander Stratton, discloses a global navigation satellite system (GNSS) landing system (GLS) and methods of using the same to calculate a vertical deviation from the glide slope of the aircraft. This system requires extensive ground-based equipment at the airport location.

U.S. Pat. No. 20050182530A1, "Global Navigation Satellite System Landing Systems and Methods," Issued to Timothy Murphy, discloses a method and system for performing satellite-supported landings in CAT II/III type landing conditions. This system also requires extensive ground-based equipment at the airport location.

U.S. Pat. No. 570,207A, "Apparatus and Method Using Relative GPS Positioning for Aircraft Precision Approach and Landing," Issued to James D. Ward, discloses a relative GPS landing system for approach and landing of aircraft where an accurate site survey of the GPS platform is unavailable. Data containing information on all GPS satellites in view is uplinked from a ground station to an aircraft. A relative solution is derived at the aircraft. Based upon the calculated solution, aircraft guidance signals are generated for approach and landing of the aircraft at a desired point.

This system involves the use of ground-based equipment, but not differential-GPS equipment, at the airport location.

All the above satellite-based relative-position-measurement systems require extensive ground facilities and modified GPS carrier equipment. They are thus not available for aircraft operating in an area outside the range of measurement systems dependent on those ground-based facilities.

An alternative is put forth in U.S. Pat. No. 5,820,080A, "Precision Equivalent Landing System Using UPS and an Altimeter," Issued to Ralph P. Eschenbach, discloses a precision equivalent landing system utilizing a satellite-based position determining system and altimeter coupled to an aircraft, which generates lateral and vertical position information of the aircraft with respect to a pre defined landing approach path. This relative position information is provided to a graphic pilot display in the aircraft Thus, this invention claims to provide an equivalent precision-landing system without requiring ground-based infrastructure at or near the airport. However, previously obtained information on the desired flight path must be provided from an independent source (e.g., published flight-path data from an airport or some other database.)

Stand-alone GPS receivers are small and relatively inexpensive. Tiny, commercially available GPS chip sets small enough to fit into a cellular phone or hand-held computer but powerful enough to receive GPS satellite signals, are readily available, and now used in some cellular phones. However, such GPS receivers do not provide real-time position and velocity measurements relative to a selected position or to a selected geometric surface, so they cannot alone provide real-time landing guidance to an airborne carrier. Hence the need for a self contained, low cost, light-weight, satellite-based method and system for real-time, on-board, relative-position determination.

SUMMARY OF THE PRESENT INVENTION

The invention consists of a micro system and method for determining onboard an aircraft real-time position and velocity of the aircraft relative to a previously defined geometric vertical and/or horizontal plane, and relative position to a reference point on the ground. It also includes the methodology for surveying the desired landing area prior to flight, and specially and mathematically defining a vertical or horizontal plane of interest, along with the target landing point. As such it can be used, for example, to either autonomously guide the aircraft to a landing location, or to aid a pilot in doing so, without the aid of any ground-based facilities.

The micro device utilized to implement the method consists of two components. The first component must be capable of providing satellite-derived measurements of inertial position and velocity, and communicate that information electronically to a computing device. The second component is a small computing device that can interrogate and receive the measurements from the former device, perform prescribed calculations using those measurements, and output the desired results from these calculations in some format readable by an electronic autopilot or by a pilot-display device. Both of the above devices, plus the autopilot and/or pilot display, are presently commercially available, or may be assembled from commercially available components. The entire position-measurement and calculation process may be performed by the computing device in almost real time, subject to computational delays of a few milliseconds. Such a hardware package can consist of small MEMS- or micro-machine-based hardware, along with a micro-processor, and thus can be light weight with low power requirements.

The invention also includes the mathematical algorithm, to be executed by the computing device, for using the inertial position and velocity measurements obtained from the satellite-navigation-based measurements to derive the current position and velocity of an airborne aircraft coupled to the micro system, relative to a previously defined geometric vertical and/or inclined horizontal plane, and the position relative to a point of interest (POI) on the ground. The invention also includes a process and mathematical algorithm for specifying, prior to flight, the location and azimuthal orientation of a geometric vertical and/or horizontal plane of interest, and the inertial position of a point of interest (POI) on the ground.

Finally, the invention also includes a method for specifying the vertical or horizontal geometric plane of interest and a point on that plane, such that the aircraft will be guided to a desired landing location. This methodology thus constitutes a landing-site survey that is performed using the disclosed micro system. In the case of the micro system being coupled to a UAV, for example, the UAV itself may be moved as needed to perform the survey. In the case of a larger vehicle, the micro device may be designed to be easily removed from the aircraft and moved as needed to perform the survey, and then re-installed on the aircraft.

BRIEF DESCRIPTION OF THE DRAWINGS

Embodiments are described below in conjunction with the appended drawing figures, wherein like reference numerals refer to like elements in the various figures, and wherein.

DETAILED DESCRIPTION OF THE INVENTION

Figure 1:
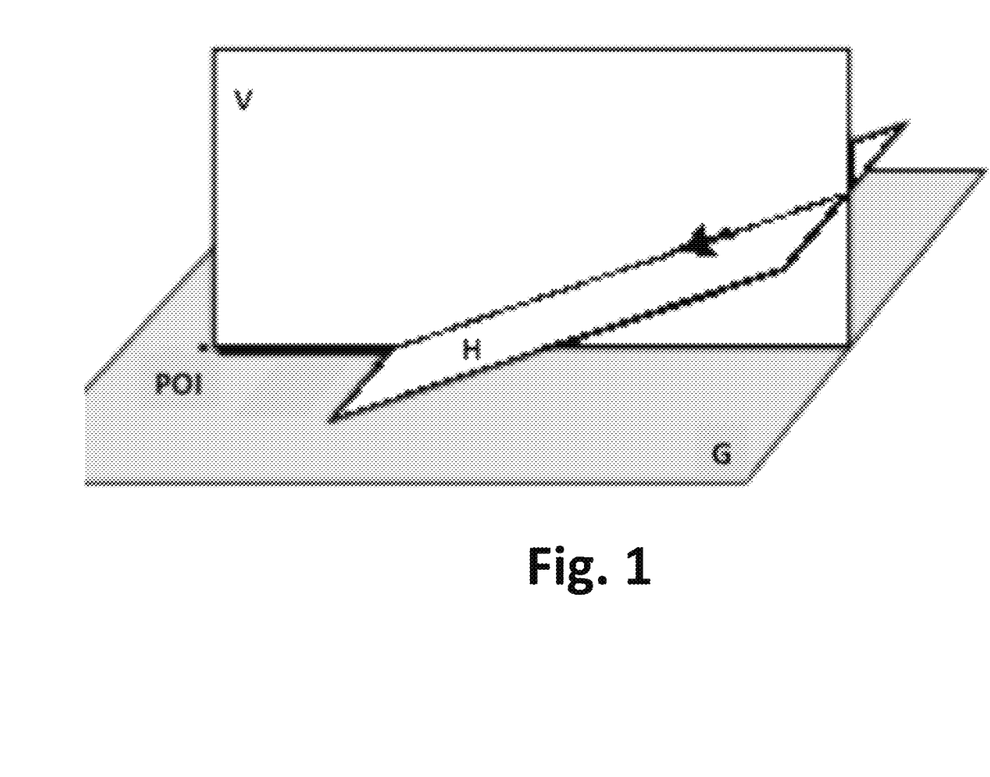
FIG. 1 is a sketch of the three intersecting geometric planes in an ILS.

Current Instrument Landing Systems (ILSs), used to guide an aircraft on a precision approach, are based on the geometry presented in FIG. 1. This figure shows three intersecting geometric planes: the ground plane labeled G, the glide-slope plane labeled H, and the vertical or localizer plane labeled V. The desired approach path for the aircraft is coincident with the line of intersection of the glide-slope and localizer planes, or H and V, and a small image of an aircraft is shown position along this line. The ILS provides real-time measurements of the vertical and horizontal position offsets from these two geometric planes, plus a realtime measurement of the slant range to the desired target point, or point of interest (POI) shown. As explaned previously, newer Ground Based Augmentation Systems (GBAS) eliminate the need for a conventional ILS, but the GBAS also requires dedicated ground-based facilities.

A key application of the invention is to provide a low-cost, light-weight alternative to the use of an ILS or GBAS by employing a self-contained, light-weight, micro-system hardware package that can be easily carried onboard an aircraft, and in particular, a small unmanned aerial vehicle (UAV). In addition, the micro-system could be easily extracted from a manned aircraft, if necessary, for a pre-flight site survey. Therefore, the invention would allow a user to operate an aircraft in an area independent of dedicated ground facilities. But the generality of the invention also allows it to be applied to other applications yet unidentified.

The Micro System

Figure 2:
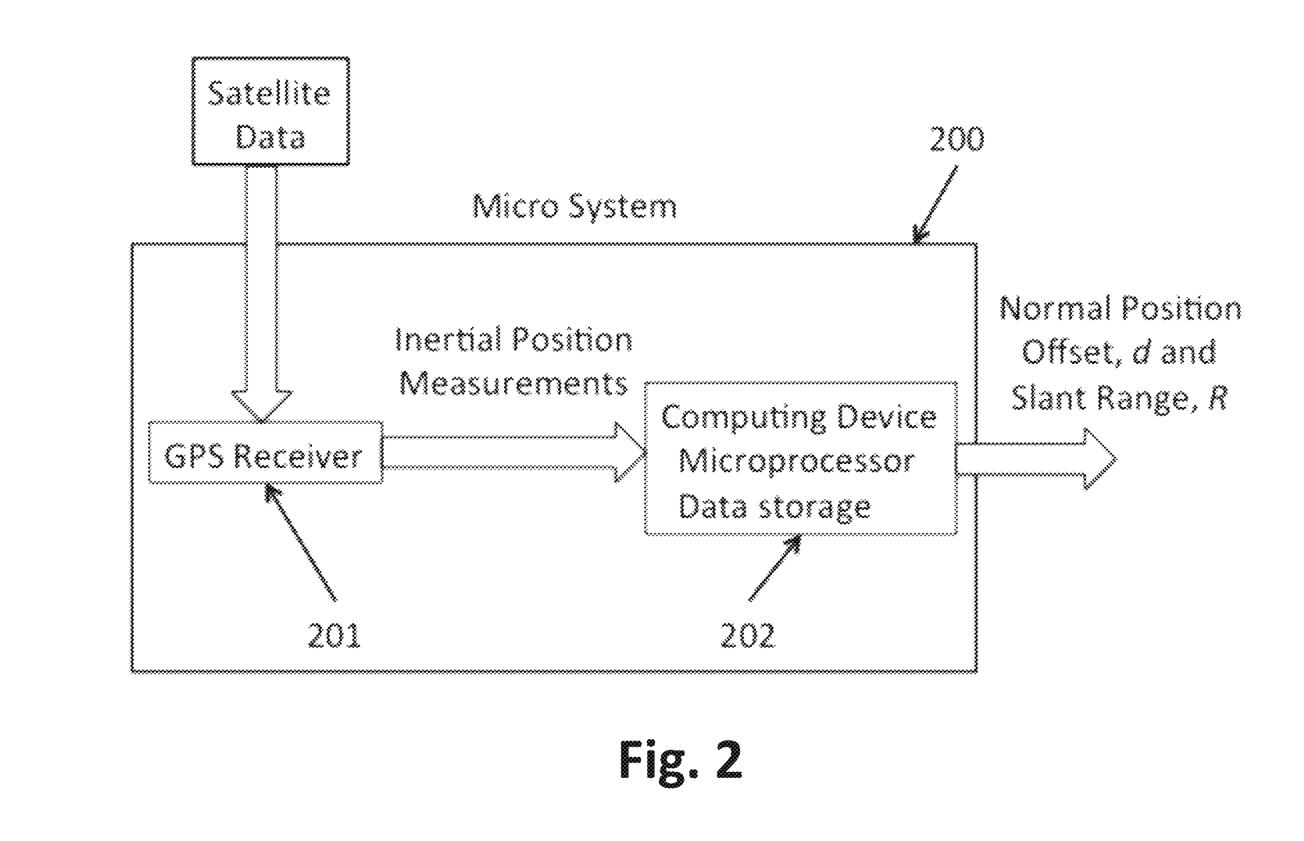
FIG. 2 is a block diagram of a micro-device package, according to an example.

The herein disclosed invention includes a micro-system 200, depicted in FIG. 2, consisting of two readily available components. The first component is a satellite-navigation receiver 201 capable of providing satellite-derived real-time measurements of inertial position and velocity of the receiver, and relaying that information electronicly to a computing device 202. The second component is the said computing device 202 that, operating in real time, can interrogate and receive the measurements from the former device 201, perform prescribed calculations using those measurements, store data for later retrieval, and output the desired results from these calculations in some readable format. The entire position-measurement and calculation process can be performed in almost real time, subject to computational delays of a few milliseconds. Both of the above devices, plus an autopilot and/or pilot display, are presently commercially available, or may be assembled from commercially available components. Such a micro system and autopilot can be small MEMS- or micro-electrical-machine-based hardware, along with a microprocessor, and can be light weight with low power requirements. So this embodiment of the micro system could be entirely coupled to a UAV, for example.

A second embodiment would include a micro system 200 that can be easily removed from, and then re-coupled to, a piloted aircraft equipped with an onboard ILS-type of pilot display. Removal would allow for the micro system to be utilized for the landing-site surveys. A third embodiment would consist of the micro-device hardware package 200 coupled to a UAV, and the computing device 202 communicating with a laptop computer or display monitor on the ground used by the UAV pilot.

Site Selection and Site Survey

The first part of the invention methodology is the mathematical description of one or two geometric planes of interest, along with a point of interest (POI) on the ground at the landing site. Mathematically, a geometric plane can be defined from the knowledge of the position of three points on that plane. Those three points must be determined by means of a landing-site survey using the micro system 200 prior to flight. The user would first select a geometric plane of interest and a point of interest (POI). Then the user surveys these items of interest using satellite-based measurements of the inertial positions of two inertial locations on the plane of interest, where one of these locations may also be the selected point of interest (POI). The inertial position of a third location of interest on the plane of interest is then derived from the previous two satellite-navigation-based measurements and from the definition of the plane of interest. And finally, this measured and derived position data are stored for later recall by the computing device 202. This plane-and-point-definition survey process is accomplished through the use of the micro system 200 just described, not including an autopilot or pilot display, and the methodology now to be further described according to an example.

Figure 3:
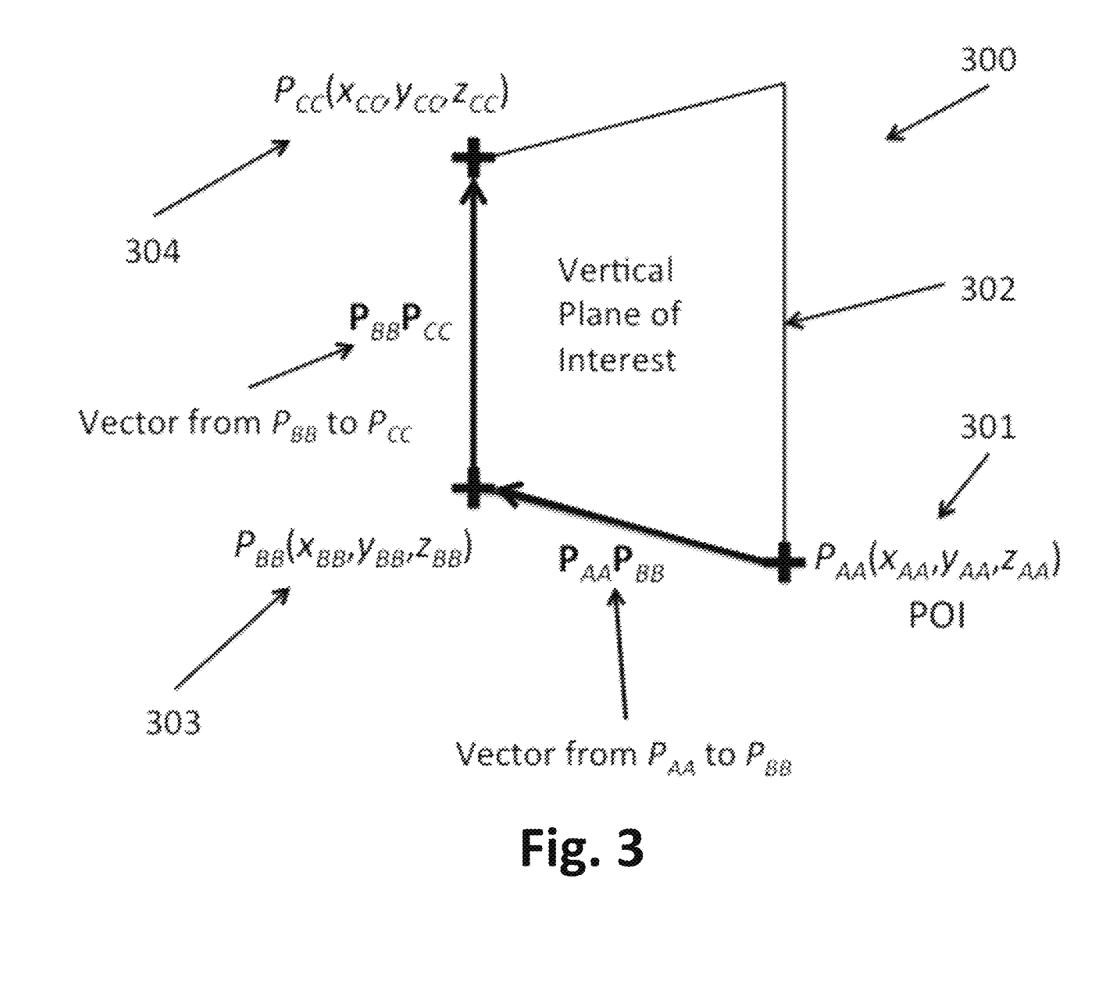
FIG. 3 is a sketch of a vertical plane of interest and point of interest (POI), according to an example.
Figure 4:
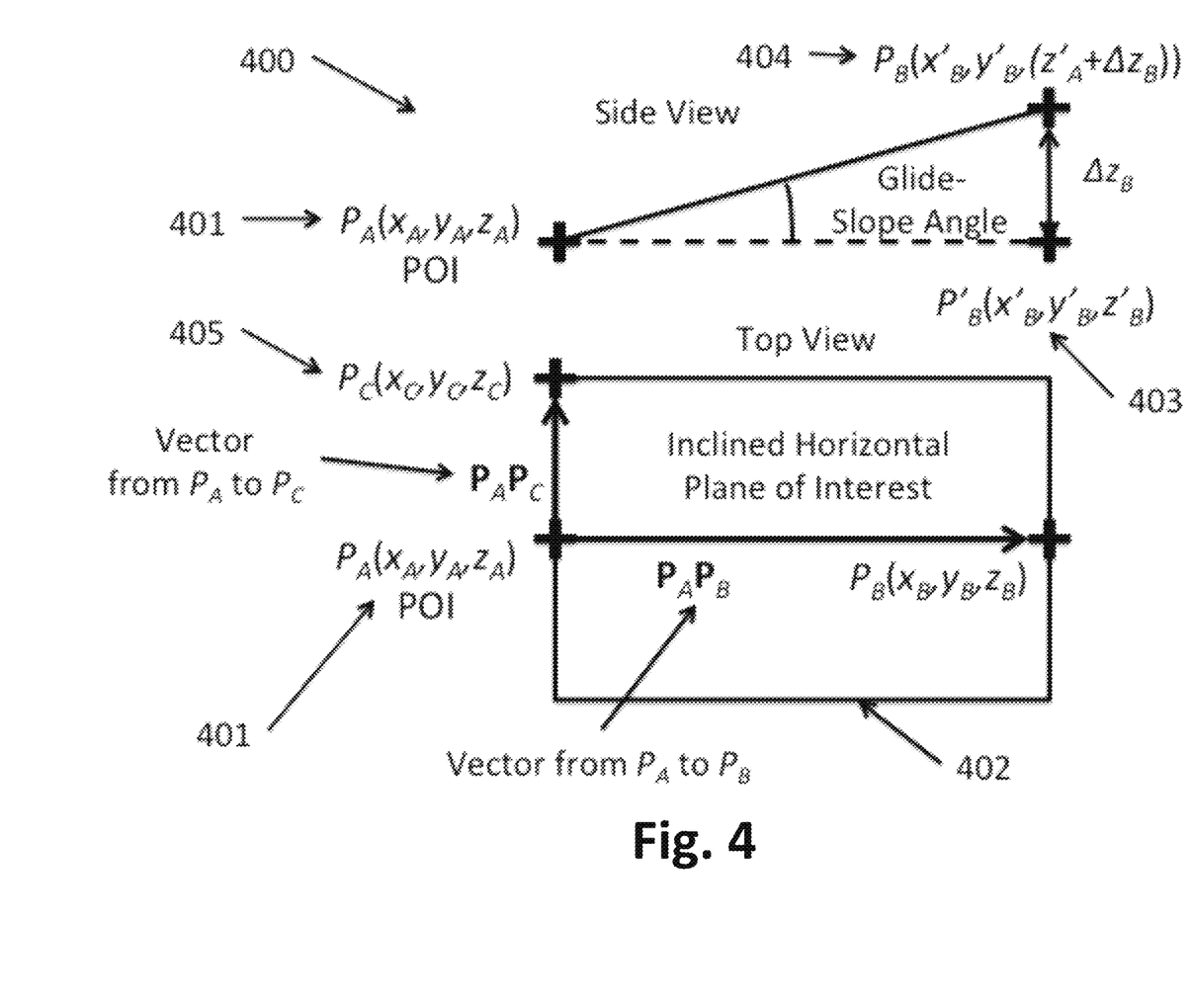
FIG. 4 is a sketch of an inclined horizontal plane of interest and point of interest (POI), according to an example.

Consider an example application involving mimicking an ILS, in which a geometric plane of interest would be a localizer and/or glide-slope plane, and the point of interest (POI) could be the desired touchdown location. For each geometric plane to be defined (e.g, localizer or glide-slope), this POI could also be one of the locations of interest (LOIs). With reference to FIG. 3 or 4, the location of this POI is denoted $P_{AA}$ 301 or $P_A$ 401, and the micro system 200 is used to measure the inertial position of this POI. Thus the position denoted as $P_{AA}(x_{AA}, y_{AA}, z_{AA})$ in FIG. 3 or $P_A(x_4, y_4, z_4)$ 4 is then known, where x, y, and z are the coordinates measured along the three orthonormal directions used in the satellite-navigation-based measurements of the inertial positions. For example, these directions might be North, East, and Down.

Then the second LOI is selected some distance from the first LOI (or POI). In the case of a vertical plane of interest 302, this location would correspond to $P_{BB}$ 303 as shown in FIG. 3. In the case of an inclined horizontal plane of interest 402, this location would correspond to $P'_B$ 403 as shown in FIG. 4. The micro system 200 is used to measure the inertial position of either of these LOIs, and thus the position denoted as $P_{BB}(x_{BB}, y_{BB}, z_{BB})$ 303 or $P'_B(x'_B, y'_B, z'_B)$ 403 is then known. If the plane of interest is an inclined horizontal plane, by selecting a desired glide-slope angle the elevation denoted $\Delta z_B$ in FIG. 4 can be calculated from trigonometry knowing the horizontal distance between $P_A$ 401 and $P'_B$ 403. Then the position of the second LOI $P_B(x'_B, y'_B, (z'_B + \Delta z_B))$ 404 is now known, or the coordinates $x_B$, $y_B$, and $z_B$ are now defined.

Note that the accuracy of the final results will depend on the distance chosen between these LOIs. Also, accuracy is typically enhanced if the micro device used to measure the x,y,z coordinates of these LOIs is the same micro device that will be coupled to the aircraft in flight.

A third location of interest (LOI) can now be derived from the aforementioned measurements of the coordinates of $P_{AA}$ 301 and $P_{BB}$ 303 or $P_A$ 401 and $P_B$ 404, and from the properties of the geometric plane of interest. This third LOI will lie on the geometric plane of interest, and must not lie along the infinite line aligned with the vector $P_{AA}P_{BB}$, shown in FIG. 3, or $P_AP_B$ in FIG. 4. With reference to FIG. 3, for which the geometric plane of interest is normal to the ground plane, the third LOI $P_{CC}$ 304 may be taken to be a point in space directly above either $P_{AA}$ 301 or $P_{BB}$ 303. If $P_{CC}$ 304 is taken to be a distance $\Delta z$ above $P_{BB}$ 303, then $$P_{CC}(x_{CC}, y_{CC}, z_{CC}) = P_{CC}(x_{BB}, y_{BB}, (z_{BB} + \Delta z)) \quad \quad 1$$

and $x_{CC}$, $y_{CC}$, and $z_{CC}$ have been determined. If $P_{CC}$ 304 is taken to be a distance $\Delta z$ above $P_{AA}$ 301, then $$P_{CC}(x_{CC}, y_{CC}, z_{CC}) = P_{CC}(x_{AA}, y_{AA}, (z_{AA} + \Delta z)) \quad \quad 2$$

In this fashion the coordinates $x_{CC}$, $y_{CC}$, and $z_{CC}$ are now defined and can be stored, along with the measured values for $x_{AA}$, $y_{AA}$, and $z_{AA}$ and $x_{BB}$, $y_{BB}$, and $z_{BB}$, for later use by the computing device 202.

If the plane of interest were instead an inclined horizontal plane 402, considering FIG. 4, the third LOI, or $P_C$ 405 could lie on the ground plane (i.e., $z_C = z_A$), and on a line through the POI at $P_A$ 401 and normal to the vector $P_AP_B$. So $x_C$ and $y_C$ may be found using trigonomitry knowing $x_A$ and $y_A$, along with the azimuth angle of the vector $P_AP_B$.

The steps to complete this first part of the methodology are then:

1. Select a plane of interest and a target point of interest (POT) on the ground.

2. Using the micro system 200, survey the plane and point of interest by obtaining the satellite-navigation-based measurements of the inertial positions of two locations of interest (LOIs) on that plane of interest, along with the point of interest (POI).
3. Denote the measured inertial positions of these two locations of interest (LOIs) on the plane of interest $P_A(x_A, y_A, z_A)$ and $P_B(x_B, y_B, z_B)$.
4. From the geometric properties of the plane of interest, select a third location of interest (LOI) such that it lies on the plane of interest and does not lie on the infinite line aligned with the vector $P_{AA}P_{BB}$ or $P_AP_B$. Denote the position of this location as $P_{CC}(x_{CC}, y_{CC}, z_{CC})$ or $P_C(x_C, y_C, z_C)$, depending on the type of plane of interest.
5. From the result of step 4, and knowing $P_{AA}(x_{AA}, y_{AA}, z_{AA})$ and $P_{BB}(x_{BB}, y_{BB}, z_{BB})$ or $P_A(x_A, y_A, z_A)$ and $P_B(x_B, y_B, z_B)$, derive the coordinates $x_C, y_C, z_C$ or $x_C, y_C, z_C$, and note that all nine x,y,z coordinates for the three LOIs are now known. If the POI does not lie on the plane of interest, also measure its z,y,z coordinates with the micro system 200.
6. Store the measured or derived values for these coordinates for later use b the computing device 202 in the micro-system 200.

Deriving the Real-Time Relative Position and Velocity

Figure 5:
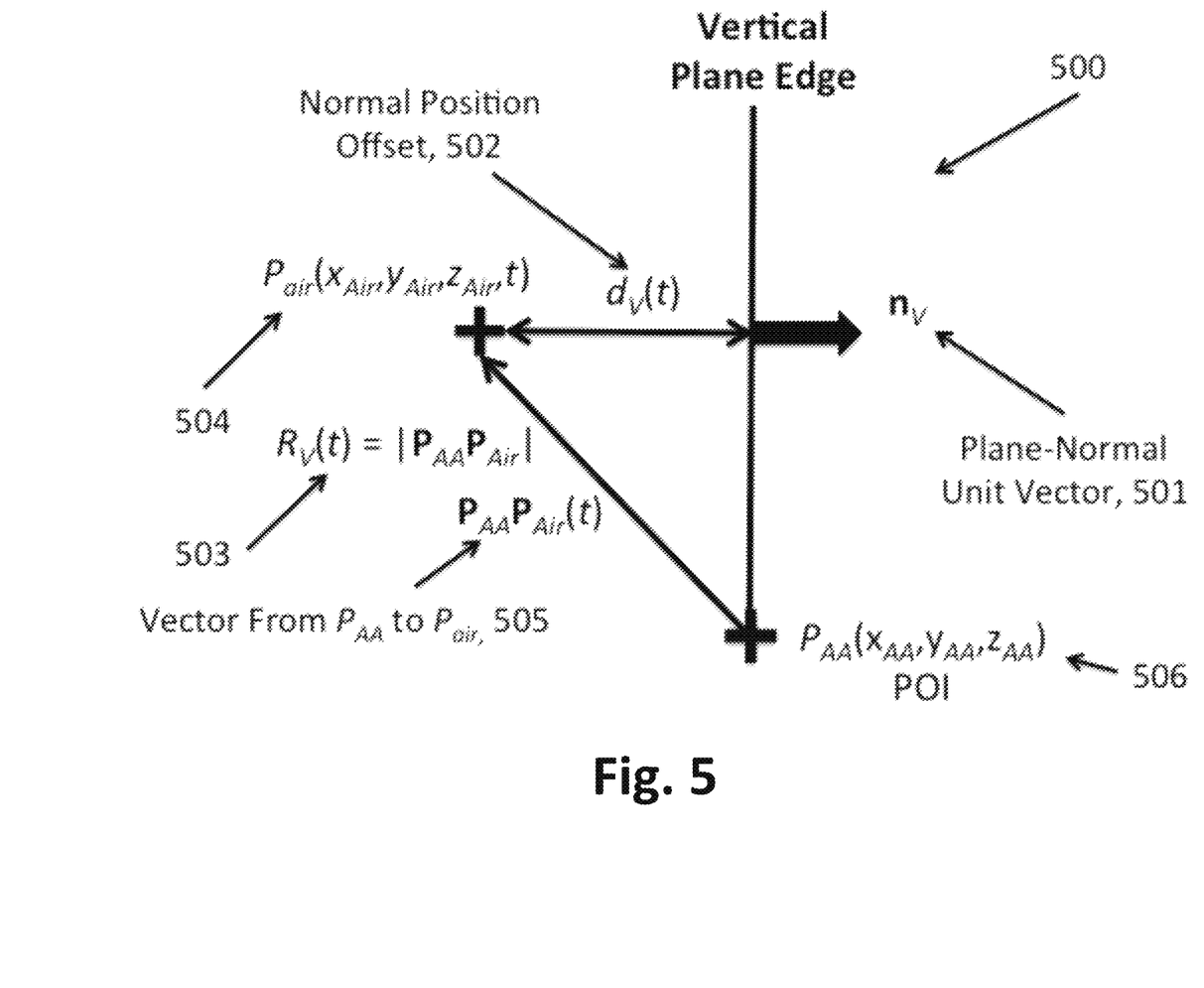
FIG. 5 is a sketch indicating the normal offset distance $d_V$ from a vertical plane, along with the slant range $R_V$ from a POI, according to an example.

The next part of the invention methology is the algorithm for deriving the real-time normal-position offset d, and its time rate of change, of the onboard micro system 200 from the previously defined plane(s) of interest. First note by referring to FIGS. 3 and 5 that the unit vector normal to a vertical plane of interest 302, or $n_V$ 501, can be found from the following vector equation and from the properties of the vector cross product (×).

$$n_V = \frac{P_{AA}P_{BB} \times P_{BB}P_{CC}}{|P_{AA}P_{BB}||P_{BB}P_{CC}|} \quad 3$$

Figure 6:
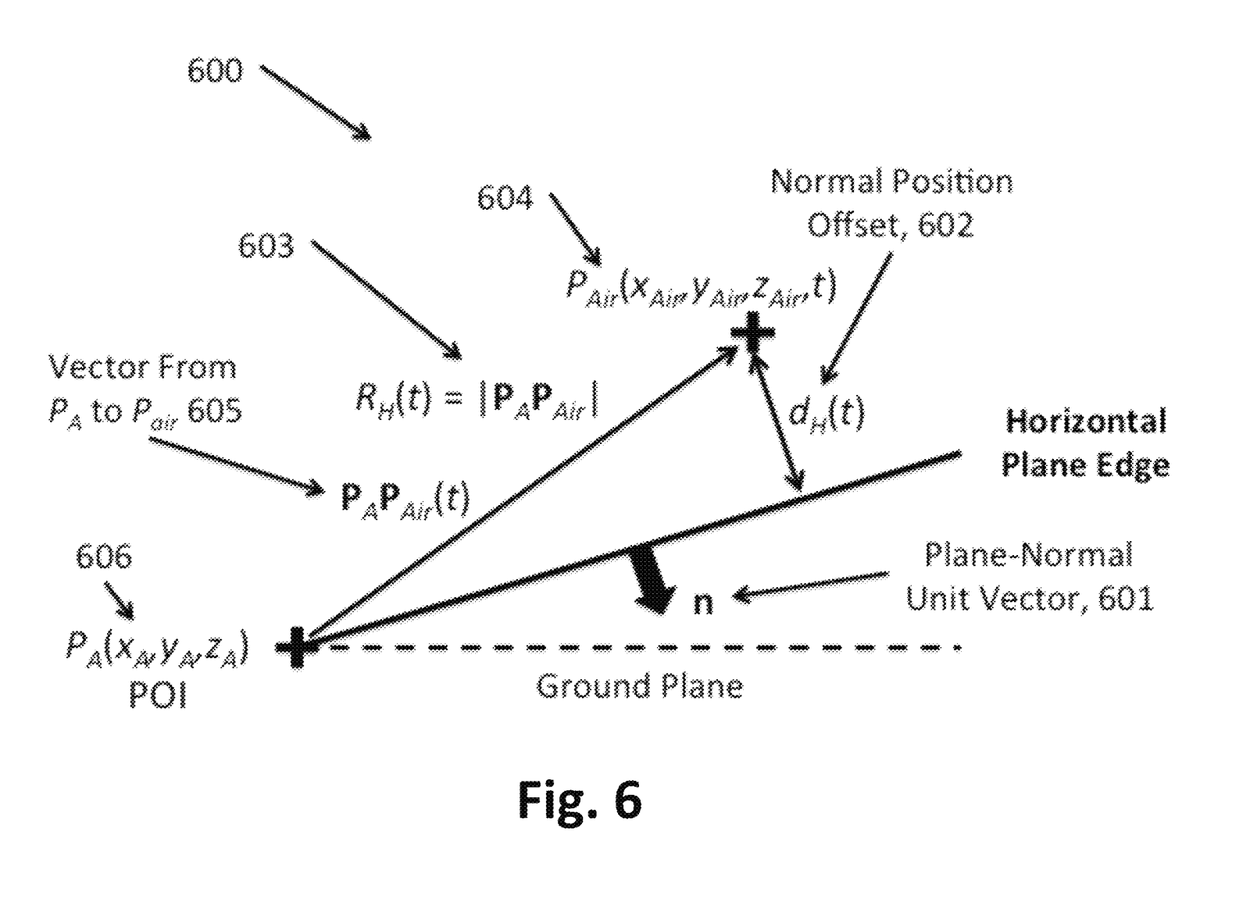
FIG. 6 is a sketch indicating the normal offset distance $d_H$ from an inclined horizontal plane, along with the slant Range $R_H$ from a POI, according to an example.

Correspondingly, by referring to FIGS. 4 and 6 note that the unit vector normal to an inclined horizontal plane of interest 402, or $n_H$ 601, can be found from a similar vector equation, or $$n_H = \frac{P_AP_C \times P_AP_B}{|P_AP_C||P_AP_B|} \quad 4$$

In the above two equations, $P_iP_j$ is the vector from location $P_i(x_i, y_i, z_i)$ to location $P_j(x_j, y_j, z_j)$, and $|P_iP_j|$ denotes the magnitude of the vector $P_iP_j$.

Note that in terms of the measured x,y,z coordinates of the LOIs, the vectors in Eqns. 3 and 4 are $P_AP_B=(x_B-x_A)i_I+(y_B-y_A)j_I+(z_B-z_A)k_I=\Delta X_{A,B}i_I+\Delta Y_{A,B}j_I+\Delta Z_{A,B}k_I$ $P_AP_C=(x_C-x_A)i_I+(y_C-y_A)j_I+(z_C-z_A)k_I=\Delta X_{A,C}i_I+\Delta Y_{A,C}j_I+\Delta Z_{A,C}k_I$ $P_{AA}P_{BB}=(x_{BB}-x_{AA})i_I+(y_{BB}-y_{AA})j_I+(z_{BB}-z_{AA})k_I=\Delta X_{AA,BB}i_I+\Delta Y_{AA,BB}j_I+\Delta Z_{AA,BB}k_I$ $P_{BB}P_{CC}=(x_{CC}-x_{BB})i_I+(y_{CC}-y_{BB})j_I+(z_{CC}-z_{BB})k_I=\Delta X_{BB,CC}i_I+\Delta Y_{BB,CC}j_I+\Delta Z_{BB,CC}k_I \quad 5$ where $i_I$, $j_I$, and $k_I$ are the three mutually orthogonal unit vectors defining an inertial reference frame aligned with the reference frame used by the satellite-navigation device 201 (e.g., North, East, Down). Likewise, the magnitudes of these vectors may be found from $|P_AP_B|=\sqrt{P_AP_B \cdot P_AP_B}=(\Delta X_{A,B}^2+\Delta Y_{A,B}^2+\Delta Z_{A,B}^2)^{1/2}$ $|P_AP_C|=\sqrt{P_AP_C \cdot P_AP_C}=(\Delta X_{A,C}^2+\Delta Y_{A,C}^2+\Delta Z_{A,C}^2)^{1/2}$ $|P_{AA}P_{BB}|=\sqrt{P_{AA}P_{BB} \cdot P_{AA}P_{BB}}=(\Delta X_{AA,BB}^2+\Delta Y_{AA,BB}^2+\Delta Z_{AA,BB}^2)^{1/2}$ $|P_{BB}P_{CC}|=\sqrt{P_{BB}P_{CC} \cdot P_{BB}P_{CC}}=(\Delta X_{BB,CC}^2+\Delta Y_{BB,CC}^2+\Delta Z_{BB,CC}^2)^{1/2} \quad 6$ where · denotes the vector dot product.

Therefore, by knowing the nine measured x,y,z coordinates corresponding to the three Leis on the plane of interest, all previously determined during the site-survey process, the unit vectors fly 501 or $n_H$ 601 can be found from Eqns. 3 or 4, respectively. Regarding Eqn. 4, for example, the cross product in the numerator yields $$P_AP_C \times P_AP_B = \quad 7$$

$$\det\begin{bmatrix} i_I & j_I & k_I \\ \Delta X_{A,C} & \Delta y_{A,C} & \Delta Z_{A,C} \\ \Delta X_{A,B} & \Delta y_{A,B} & \Delta Z_{A,B} \end{bmatrix} = (\Delta Y_{A,C}\Delta Z_{A,B} - \Delta Z_{A,C}\Delta Y_{A,B})i_I +$$

$$(\Delta Z_{A,C}\Delta X_{A,B} - \Delta X_{A,C}\Delta Z_{A,B})j_I + (\Delta X_{A,C}\Delta Y_{A,B} - \Delta Y_{A,C}\Delta X_{A,B})k_I$$

which, along with the appropriate expressions in Eqns. 6, allows for Eqn. 4 to be evaluated. Similarly, Eqn, 3 may be evaluated as well.

Now referring to FIGS. 5 and 6, the position offset distance $d_V(t)$ 502 or $d_H(t)$ 602 and range to the point of interest (POI) $R_V(t)$ 503 or $R_H(t)$ 603 may be found. Let the current inertial position at time t of the airborne micro system 200 be denoted as $P_{Air}(x_{Air}, y_{Air}, z_{Air}, t)$ 504 or 604, depending on the plane of interest.

Similar to Eqns. 5, the time-dependent, relative-position vector from the POI $P_A$ 506 or $P_A$ 606 to the carrier position $P_{Air}$, or $P_{AA}P_{Air}(t)$ 505 or $P_AP_{Air}(t)$ 605, can now be expressed as $P_{AA}P_{Air}(t)=\Delta X_{AA,Air}(t)i_I+\Delta Y_{AA,Air}(t)j_I+\Delta Z_{AA,Air}(t)k_I$ or $P_AP_{Air}(t)=\Delta X_{A,Air}(t)i_I+\Delta Y_{A,Air}(t)j_I+\Delta Z_{A,Air}(t)k_I \quad 8$ (It is assumed here that the POIs are also LOIs on the planes of interest.) So still referring to FIGS. 5 and 6, the time-dependent normal-position offset from the geometric plane of interest, $d_V(t)$ 502 or $d_H(t)$ 602, may be found from the properties of the vector dot product to be $d_V(t)=n_V \cdot P_{AA}P_{Air}(t)$ $d_H(t)=n_H \cdot P_AP_{Air}(t) \quad 9$ Expressing the vectors $n_V$ and $P_{AA}P_{Air}(t)$ in terms of their inertial components, that is, letting $n_V=X_{nV}i_I+Y_{nV}j_I+Z_{nV}k_I$ $P_{AA}P_{Air}(t)=X_{AA,Air}(t)i_I+Y_{AA,Air}(t)j_I+Z_{AA,Air}(t)k_I \quad 10$ the normal-position offset $d_V(t)$ 502 is found from Eqn. 9 to be $d_V(t)=n_V \cdot P_{AA}P_{Air}(t)=X_{nV}X_{AA,Air}(t)Y_{nV}Y_{AA,Air}(t)+Z_{nV}Z_{AA,Air}(t) \quad 11$ And similarly, $d_H(t)$ 602 may be determined as well.

Note that the sign of $d_V(t)$ 502, as found from Eqn. 11, will determine whether the micro system 200 coupled to the aircraft is to the left or the right of the vertical plane of interest shown in FIG. 5, while the sign of $d_H(t)$ 602 will determine whether the onboard micro system 200 is above or below the inclined horizontal plane of interest shown in FIG. 6. With the LOIs and vectors as shown in FIGS. 3-6, a positive $d_V$ 502 indicates that the onboard micro system is to the right of the vertical plane, as viewed from the POI $P_{AA}$ 506. Similarly, a positive $d_H$ 602 indicates that the onboard micro system 200 is below the inclined horizontal plane, as viewed from the POI $P_A$ 606.

To calculate the rate of change of the offset distance $d_V(t)$ 502 or $d_H(t)$ 602, that is, $\dot{d}_V(t)$ or $\dot{d}_H(t)$, respectively, write the inertial velocity of the onboard micro system 200 in terms of the rates of change of its inertial-position coordinates, or $$\dot{P}_{Air}(\dot{x}_{Air}, \dot{y}_{Air}, \dot{z}_{Air}, t)$$

in which $\dot{x}_{Air}$, $\dot{y}_{Air}$, and $\dot{z}_{Air}$ are the orthonormal inertial velocity components measured by the satellite-navigation receiver 201 corresponding to the measured x,y,z components of inertial position. Consistent with this notation, the inertial rate of change of the relative-position vector $P_{AA}P_{Air}$, written as $P_{AA}\dot{P}_{Air}$ may be expressed as $$P_{AA}\dot{P}_{Air}(t) = \dot{x}_{Air} i_I + \dot{y}_{Air}(t) j_I + \dot{z}_{Air}(t) k_I \qquad 12$$

And consistent with the first of Eqns. 9 and of Eqns. 10, the rate of change of the offset distance $d_V(t)$ 502 may be expressed as $$\dot{d}_V(t) = n_V \cdot P_{AA}\dot{P}_{Air}(t) = (X_n \dot{x}_{Air}(t) + Y_n \dot{y}_{Air}(t) + Z_n \dot{z}_{Air}(t)) \qquad 13$$

In like manner, the rate of change of $d_H(t)$ 602 may be determined as well.

Note that the signs of $d_V(t)$ 502 and of its rate of change, $\dot{d}_V(t)$, as found from Eqns. 11 and 13, will determine whether the onboard micro system 200 is moving toward or away from the vertical plane of interest, while the sign of $d_H(t)$ 602 and its rate of change, $\dot{d}_H(t)$, will determine whether the onboard micro system 200 is moving toward or away from the inclined horizontal plane of interest.

Finally, the slant range $R_V(t)$ 503 or $R_H(t)$ 603 of the onboard micro system 200 relative to the selected point of interest (POI) (for example, $P_{AA}$ 506 or $P_A$ 606, respectively) is given by $$R_V(t) = |P_{AA}P_{Air}(t)| = \sqrt{P_{AA}P_{Air}(t) \cdot P_{AA}P_{Air}(t)}$$

or $$R_H(t) |P_A P_{Air}(t)| = \sqrt{P_A P_{Air}(t) \cdot P_A P_{Air}(t)} \qquad 14$$

depending on the plane of interest.

Finally, note that Eqns. 8-14 are all calculated in real time using the real-time position updates for $P_{Air}$ Obtained from the satellite-based receiver 201, and hence the relative offset distances $d(t)$, relative velocities $\dot{d}(t)$, and slant ranges $R(t)$ are all available onboard the aircraft and may be used in autonomous guidance-and-control algorithms or displayed to the pilot.

What is claimed is:

1. A self-contained precision-landing equivalent navigation method comprising the steps of:
   defining, in terms of position and orientation, a target landing location as well as a virtual vertical and/or an inclined horizontal plane associated with said target landing location, such definitions to be determined by a satellite-based landing-site-surveying system that provides the position measurements for said target landing location denoted $P_A(x_A, y_A, z_A)$ and/or $P_{AA}(x_{AA}, y_{AA}, z_{AA})$ as well as two other locations on said desired vertical plane, denoted $P_{BB}(x_{BB}, y_{BB}, z_{BB})$ and $P_{CC}(x_{CC}, y_{CC}, z_{CC})$, and/or two other locations on said desired inclined horizontal plane $P_B(x_B, y_B, z_B)$ and $P_C(x_C, y_C, z_C)$, all chosen according to the desired geometry of said planes, and the following equations for the unit vectors normal to said vertical ($n_V$) and said inclined horizontal ($n_H$) plane $$n_V = \frac{P_{AA}P_{BB} \times P_{BB}P_{CC}}{|P_{AA}P_{BB}||P_{BB}P_{CC}|}$$

$$n_H = \frac{P_A P_C \times P_A P_B}{|P_A P_C||P_A P_B|}$$

where $P_i P_j$ is the vector from location $P_i(x_i, y_i, z_i)$ to location $P_j(x_j, y_j, z_j)$, $|P_i P_j|$ denotes the magnitude of the vector $P_i P_j$, × denotes the vector cross product, $(x_i, y_i, z_i)$ denotes the coordinates of location $P_i$ defined along the three orthonormal directions used in the measurements of said location $P_i$;

generating the current onboard lateral and/or vertical position offset(s) from said virtual vertical and/or inclined horizontal plane, said lateral and/or vertical position offset(s) generated by a satellite-based relative-position determination system to be coupled to an aircraft using aircraft position measurements $P_{Air}(x_{Air}, y_{Air}, z_{Air}, t)$ and aircraft-velocity measurements $\dot{P}_{Air}(\dot{x}_{Air}, \dot{y}_{Air}, \dot{z}_{Air}, t)$ and the following equations for said offsets from the said vertical and/or inclined horizontal plane, $d_V$ or $d_H$, respectively, and for the rates of change of said lateral and/or vertical position offset(s), d.under-dot.$_V$ (t) and d.under-dot.$_H$ (t), respectively, $$d_V(t) = n_V \cdot P_{AA}P_{Air}(t) \dot{d}_V(t) = n_V \cdot P_{AA}\dot{P}_{Air}(t)$$

$$d_H(t) = n_H \cdot P_A P_{Air}(t) \dot{d}_H(t) = n_H \cdot P_A \dot{P}_{Air}(t)$$

where · denotes the vector dot product, $P_A P_{Air}$ is the vector from the said target landing location $P_A(x_A, y_A, z_A)$ to the time-dependent location of the aircraft $P_{Air}(x_{Air}, y_{Air}, z_{Air}, t)$, $P_{AA}P_{Air}$ is the vector from the said target landing location $P_{AA}(x_{AA}, y_{AA}, z_{AA})$ to the time-dependent location of the aircraft $P_{Air}(x_{Air}, y_{Air}, z_{Air}, t)$, $P_A \dot{P}_{Air}$ (t) is the time rate of change of the vector $P_A P_{Air}$ with respect to the inertial reference frame, $P_{AA}\dot{P}_{Air}(t)$ is the time rate of change of the vector $P_{AA}P_{Air}$ with respect to the inertial reference frame, and $$P_A \dot{P}_{Air}(t) = P_{AA}\dot{P}_{Air}(t) = \dot{x}_{Air}(t) i_I + \dot{y}_{Air}(t) j_I + \dot{z}_{Air}(t) k_I;$$

generating onboard slant range from said target landing location, said slant range generated by a satellite-based relative-position determination system to be coupled to an aircraft along with said position measurements and the following equations for slant range R(t)

$$R_V(t) = |P_{AA}P_{Air}(t)|$$

or $$R_H(t) = |P_A P_{Air}(t)|$$

where $|P_A P_B(t)|$ denotes the magnitude of the time-dependent vector $P_A P_B(t)$;

wherein said position offsets and slant range are either used by an autopilot to autonomously guide said aircraft to a landing location or, displayed on a graphic display used by a pilot to guide said aircraft to a landing location, the graphic display being adapted to be disposed either within said aircraft or on the ground near said target landing location for concurrently displaying a visual representation of said lateral and/or vertical position of said aircraft with respect to said vertical and/or inclined horizontal planes as well as said slant range to said target landing location without requiring any other ground-based navigation infrastructure at or near the landing site, or any information, other than satellite-based navigation data, that must be obtained from any other source.

2. The self-contained precision-landing equivalent navigation method of claim 1 wherein said steps of defining a target landing location as well as a virtual vertical and/or an inclined horizontal plane associated with said target landing location, generating the current onboard lateral and/or vertical position offset(s) from said virtual vertical and/or inclined horizontal plane, and generating onboard slant range from said target landing location using a satellite-based radio navigation position determining system further includes the steps of defining a target landing location as well as a virtual vertical and/or an inclined horizontal plane associated with said target landing location, generating the current onboard lateral and/or vertical position offset(s) from said virtual and/or inclined horizontal plane, and generating onboard slant range from said target landing location using the Global Positioning System.

3. The self-contained precision-landing equivalent navigation method of claim 1 wherein said steps of defining a target landing location as well as a virtual vertical and/or an inclined horizontal plane associated with said target landing location, generating the current onboard lateral and/or vertical position offset(s) from said virtual vertical and/or inclined horizontal plane, and generating onboard slant range from said target landing location using a satellite-based radio navigation position determining system further includes the steps of defining a target landing location as well as a virtual vertical and/or an inclined horizontal plane associated with said target landing location, generating the current onboard lateral and/or vertical position offset(s) from said virtual vertical and/or inclined horizontal plane, and generating onboard slant range from said target landing location using any other Global Navigation Satellite System.

4. The self-contained precision-landing equivalent navigation method as recited in claim 1 wherein said steps of defining a target landing location as well as a virtual vertical and/or an inclined horizontal plane associated with said target landing location, generating the current onboard lateral and/or vertical position offset(s) from said virtual vertical and/or inclined horizontal plane, and generating onboard slant range from said target landing location further includes the steps of:

receiving satellite-based navigation data at the satellite-based navigation-data receivers of said landing-site-surveying system and of said relative-position determination system, processing said satellite-based navigation data using data processors of said landing-site-surveying system and of said relative-position determination system to define a target landing location as well as a virtual vertical and/or an inclined horizontal plane associated with said target landing location, generate the current onboard lateral and/or vertical position offset(s) from said virtual vertical and/or inclined horizontal plane, and generate onboard slant range from said target landing location, said satellite-based navigation data received from said satellite-based navigation-data receiver at an input of said data processor; and providing said current onboard lateral and/or vertical position offset(s) from said virtual vertical and/or inclined horizontal plane, and onboard slant range from said target landing location to said autopilot or said graphic display via an output of said data processor.

* * * * *